United States Patent [19]
Torigoe et al.

[11] Patent Number: 5,812,152
[45] Date of Patent: Sep. 22, 1998

[54] IMAGE FORMATION METHOD FOR FORMING IMAGES ON LENTICULAR PLATE, RECORDING APPARATUS, AND INFORMATION PROCESSING SYSTEM PROVIDED WITH SUCH RECORDING APPARATUS

[75] Inventors: Makoto Torigoe, Tokyo; Hiromitsu Hirabayashi, Yokohama; Tsutomu Osaka, Kawasaki; Miyuki Fujita, Tokyo, all of Japan

[73] Assignee: Canon Kabushiki Kaisha, Tokyo, Japan

[21] Appl. No.: 555,149

[22] Filed: Nov. 8, 1995

[30] Foreign Application Priority Data

Nov. 10, 1994 [JP] Japan ................................ 6-276788

[51] Int. Cl.$^6$ .......................................... B41J 3/00
[52] U.S. Cl. ................................................ 347/2
[58] Field of Search .................... 347/2, 3, 4, 20

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,404,587 | 9/1983 | Levine ................................ 348/263 |
| 4,459,600 | 7/1984 | Sato et al. . |
| 4,463,359 | 7/1984 | Ayata et al. . |
| 4,558,333 | 12/1985 | Sugitani et al. . |
| 4,608,577 | 8/1986 | Hori . |
| 4,723,129 | 2/1988 | Endo et al. . |
| 4,740,796 | 4/1988 | Endo et al. . |
| 5,424,553 | 6/1995 | Morton ................................ 250/548 |

FOREIGN PATENT DOCUMENTS

| | | |
|---|---|---|
| 54-056847 | 5/1979 | Japan . |
| 59-123670 | 7/1984 | Japan . |
| 59-138461 | 8/1984 | Japan . |
| 60-071260 | 4/1985 | Japan . |
| 4136836 | 5/1992 | Japan . |
| 5216138 | 8/1993 | Japan . |
| 6-52291 | 2/1994 | Japan . |
| 6-340099 | 12/1994 | Japan . |

*Primary Examiner*—Adolf Berhane
*Attorney, Agent, or Firm*—Fitzpatrick, Cella, Harper & Scinto

[57] ABSTRACT

A lenticular method is known as method for forming stereoscopic images or animated images on a lenticular plate. This method uses a film as an aggregate element having a plurality of lenses provided with almost semi-cylindrical extrusions (circular extrusions). This invention relates to the image formation on a recording medium (lenticular plate) of a lenticular type. With the provision of a device for detecting relative misregisteration between images and the lenses constituting the lenticular plate, and a device for positioning the images and lenses, extra work and costs are saved. Also, with simple structures on both recording apparatus and plate sides, the formation of high quality stereoscopic images or animated images is materialized.

92 Claims, 8 Drawing Sheets

DISPLACEMENT IN ARRANGEMENT
DIRECTION OF LENTICULAR PLATE
CYLINDRICAL LENS

IMAGE FORMATION METHOD FOR FORMING IMAGES ON LENTICULAR PLATE, RECORDING APPARATUS, AND INFORMATION PROCESSING SYSTEM PROVIDED WITH SUCH RECORDING APPARATUS

BACKGROUND OF THE INVENTION

1. Field of the Invention

The present invention relates to an image formation method for forming stereoscopic images or animated images on a lenticular plate, an ink jet recording apparatus, and an information processing system.

2. Related Background Art

In recent years, the performance of an information processing system, such as a copying machine, facsimile apparatus, printer, word processor, and personal computer, has been improved rapidly. The kinds of recording media serving as output media for those information processing systems have also been developed widely, including paper, cloth, plastic sheet, and OHP sheet.

Meanwhile, along with the enhanced performance of computers, attention has been increasingly given not only to the three-dimensional computer graphics, but also to the formation of three-dimensional images such as virtual reality whose market is expected to expand greatly in future, leading to demands on new printing media capable of outputting such three-dimensional images. As a result, there have been proposed various methods and means for providing the stereoscopic vision of a three-dimensional image that has been recorded on a flat recording medium such as a recording sheet.

As a method for stereoscopically visualizing images, there are known those utilizing the parallax between eyes, and those utilizing the formation of spatial images. For the method that utilizes the parallax between eyes, the anaglyph method using stereoscopic glasses, method using polarizing glasses, method using time-shared shutter, or the like, and the lenticular method that uses no glasses are typical ones. On the other hand, the hologram is typical for the method utilizing spatial images.

Since the lenticular method does not need any stereoscopic glasses, studies and researches are in progress on its application to the three-dimensionally printed static pictures, and animated pictures for television or the like.

Here, the brief description will be made of the lenticular method. For this method, there are adopted for use a lenticular plate having the surface that functions as a lens aggregate provided with a plurality of almost semi-cylindrical extrusions (circular extrusions), and the back side formed flatly without such extrusions; and a lenticular print medium formed by a printing layer arranged over the back side of the sheet. To form the surface portion of this medium, it is generally practiced to use a special film having semi-cylindrical fine lenses arranged by press molding on the film. One unit of this lens group is called "lenticule or lenticular", and this special film is called "a lenticular film or lenticular sheet" or the like. The "lenticular plate" is an expedient term given to a plate described below, which is formed by providing a printing layer for a lenticular film, but depending on recording materials, it may be possible to directly produce images in the form of film. Thus the lenticular plate used for the following description includes a lenticular film. Also, the expression "plate" may be interpreted to mean a plate type flat medium, but the lenticular film itself is flexible to a certain extent even though it is harder than a paper sheet usually used as a recording medium. Here, it is assumed that a sheet type lenticular recording medium is also called a "lenticular plate".

The stereoscopic images to be recorded on the printing layer are either of a twin lens type or multiple image type. In case of a twin lens type, original images corresponding to the left and right eyes of an observer are recorded on the printing layer, and then, when these images on the printing layer are observed by the observer through the lenticular plate, the images are made stereoscopically visible because of the parallax of the observer's eyes.

The principle of this stereoscopic vision will be described in conjunction with FIG. 1. A reference numeral 21 designates a lenticular plate and 22, a printing layer where images are formed. The printing layer 22 is substantially positioned on each focal point of the cylindrical lenses 23 constituting the lenticular plate 21. On the printing layer, two images A and B, which are finely divided by cutting in the direction perpendicular to the surface of FIG. 1, are arranged alternately corresponding to each of cylindrical lens on the lenticular plate. Now that images A and B are respectively on the focal point of each cylindrical lens, only either one of the images A and B is visible depending on the direction of the visual point EA or EB. When these images A and B are arranged as those formed in accordance with parallax by the left and right eyes, a stereoscopic image is obtainable. If these images A and B are arranged as different images, it is possible to observe a plurality of images due to the parallax. With the images A and B arranged as a continuation of animated images, it is possible to represent animated images if the position of parallax is made shiftable continuously. Further, it is not only possible to arrange the two-valued images, but also, a three- or four-valued images, or more images likewise in one cylindrical lens. In this case, the angle (namely, the direction of visual point) that makes a stereoscopic vision possible becomes wider with respect to stereoscopic images. There is also an effect that the number of animated images can be increased with respect to an animation.

In this respect, the recording of images on the lenticular plate is attained in such a manner that images corresponding to each of the images A and B are divided into strips. Then, the images are prepared by joining them one after another and recorded to align them with the focal point of each lens. Also, when increasing the number of images, it is possible to record appropriate images or animated images, which are made stereoscopically visual, by adjusting the width of each divided image on strip depending on the numbers of images and cylindrical lenses.

Also, for the recording apparatus used for recording such images, it is desirable to adopt a recording apparatus capable of performing exact printing in high density at high speeds. As a preferably satiable recording method for the purpose, an ink jet recording method can be cited. The ink jet recording method makes it possible to perform non-impact recording. Its recording head and recording medium are not in contact with each other. Ink droplets are discharged onto the printing layer directly and caused to adhere to it. Thus the printing is possible at lower noises. Also, it is possible to easily operate and control a highly densified recording at a high speed. Therefore, a recording apparatus that adopts such ink jet recording method has been utilized and on the market as a printer suitably usable as output means of an information processing system, such as a copying machine, facsimile apparatus, electronic typewriter, word processor, work station or the like, or a handy or portable printer provided for a personal computer, host computer, optical disc device, video system, or the like. In such cases, an ink jet recording apparatus of a kind is of course structured to be suitably adoptable with the functions genuine to each system and the mode of use or the like. In this respect, when an ink jet recording apparatus is adopted for recording on a lenticular plate, it is desirable to prepare its recording surface with a printing layer provided with effective ink absorption in consideration of good fixation of ink to be applied.

When manufacturing lenticular printing media, a step is needed for bonding together the printing layer (a recording sheet, for example) for images to be set on, and the lenticular plate. In this respect, then, a problem is encountered that it requires extra work and costs.

Also, it is necessary to arrange the position of the image array on the printing layer so as to be aligned exactly with the position of the cylindrical lens array on the lenticular plate. Therefore, it has been difficult to manufacture them at very fine pitches: it is thus impossible to obtain images in high resolution, and the stereoscopic images and the animated images represented using a plurality of images by means of the lenticular plate are inevitably only those images of low resolution, lacking preciseness.

Also, if the image array on the printing layer and the cylindrical lens array on the lenticular plate are misregistered when recording intended stereoscopic images, it becomes impossible to make them stereoscopically visible when observed from the front side in some cases or in the worst case, a problem is encountered that the images that should be observed by the left and right eyes are reversed, and the images do not present themselves as stereoscopic ones at all.

Further, when the pitches of the image array and the cylindrical lens array on the lenticular plate are deviated, moire is caused to appear on each visible image because, even if an alignment is made in a certain portion, the misregisteration gradually takes place in the portions away from such portion once aligned.

With a view to solving the problems described above, several methods have been proposed up to now. For example, in Japanese Patent Laid-Open Application No. 4-136836, a method is disclosed, wherein the misregisteration between the cylindrical lenses and images is removed by feeding a lenticular plate by use of a roller having notches fitting the cylindrical lenses on the lenticular plate, and printing is made on the reverse side by means of thermal head. In this case, however, since the roller having the notches on it is in contact with the surface of cylindrical lenses directly, there is a problem that the lenses are subjected to scratches and stains, and that the head is often damaged because it contacts the plate that is harder than paper. Also, there is a problem that the quality of printed images is made inferior despite the running costs are comparatively high.

Also, in Japanese Patent Laid-Open Application No. 5-216138, a method is disclosed, wherein laser beam scans on the photosensitive layer formed on a lenticular plate, but in this case, an antihalation layer is needed because light scattering takes place due to the nature of the lenticular plate as referred to also in the application hereof. Therefore, a problem is encountered that the structure of the photosensitive layer should become complicated when images are to be formed in color. Further, as the plate is provided with the photosensitive layer, attention should be given to the fact that the plate is kept in a state that it is sealed from light. Moreover, in the Japanese Patent Laid-Open Application No. 5-216138, a method is further disclosed, wherein the cylindrical lenses are positioned by arranging the extrusions of the lenses arranged to block up the beam irradiated in the direction of generatrix of the cylindrical lenses on the lenticular plate. In accordance with this method, however, the optical path should be elongated for detection to be made. Therefore, it becomes difficult to perform required detection when a lenticular plate should be made wider or the plate is caused to be fed aslant.

SUMMARY OF THE INVENTION

With a view to solving the problems described above, the present invention is designed. It is an object of the invention to provide an ink jet recording apparatus capable of positioning images and a lenticular plate easily by detecting relative misregisterations between them, an information processing system provided with such apparatus as its output means, and a method for recording images on a lenticular plate applicable to such apparatus.

In order to achieve this object, an ink jet recording apparatus of the present invention is provided with a recording head to form images on a recording medium, and means for feeding the recording medium, this recording apparatus being arranged to use, as a recording medium, a lenticular plate provided with a lenticular having a plurality of lenses arranged on it. The aforesaid ink jet recording apparatus comprises a plurality of such lenses; detection means for detecting misregisteration of images corresponding to the lenses; and control means for driving the recording head in accordance with the results of detection by such detection means.

Preferably, the lenticular plate is provided with an area for image formation and an area for a margin adjacent to the image formation area, and then, the detection means for detecting misregisteration comprises images for use of discrimination recorded by the recording means on the marginal area in the arrangement direction of the lenticular lenses, while changing the amount of misregisteration.

Also, preferably, an apparatus is structured to be able to select images recorded in appropriate positions by a specific timing from among a plurality of images for use of discrimination after the images have been recorded for use of such discrimination.

Also, in order to solve the problems described above, an ink jet recording apparatus of the present invention is provided with a recording head to form images on a recording medium by discharging ink, and means for feeding the recording medium, the apparatus being structured to form images on a lenticular plate, serving as the recording medium, provided with a lenticular having a plurality of lenses arranged on it. This ink jet apparatus comprises detection means for detecting the relative positions between a plurality of such lenses and the recording head, and control means for driving the recording head in accordance with the result of detection by such detection means.

Also, the detection means includes a photosensor, and by means of such photosensor, the surface of the lenticular plate is scanned. The control means controls the driving of the recording means in accordance with the detection signals with respect to the cyclical changes of the irregularities of the aforesaid surface, the cyclical changes being obtainable by means of the photosensor that scans the surface.

Also, the control means uses the detection signals as triggers with respect to the cyclical changes of the irregularities of the surface obtainable by means of the photosensor that scans the surface, and controls the driving of the head in accordance with such triggers in order to control the recording positions exactly with respect to the lenses.

Further, as a method applicable to the aforesaid ink jet recording apparatus, the method for recording images on a lenticular plate of the present invention uses as its recording medium a lenticular plate having the surface provided with a plurality of lenticular lenses each having convex surface, and the flat reverse side thereof, this method comprising the steps of detecting the relative positions between the lenticular lenses and the images formed on the lenticular lenses; positioning the images and the lenticular lenses in accordance with the result of such detection; and recording a plurality of fragments of images in specific positions on the reverse side of the lenticular lenses in accordance with the positioning thus performed.

Further, as an image formation method provided with a recording head to form images on a recording medium and means for feeding the recording medium in order to form images on a lenticular plate serving as a recording medium, which is provided with a lenticular having a plurality of lenses arranged on it, the method for forming images on the lenticular plate of the present invention comprises a test image recording step of recording a plurality of given images in a given area of the lenticular plate at given intervals; a selection step of selecting one specific image from among a plurality of such given images; an image formation step of forming images by controlling the driving of the recording head in accordance with the specific image thus selected in such selection step.

Further, in accordance with the present invention, an image formation method is provided with a recording head to form images on a recording medium, and means for feeding the recording medium. This method uses, as a recording medium, a lenticular plate having the surface provided with a lenticular having a plurality of lenses arranged on it, and the flat reverse side, and comprises the steps of detecting the relative positions between the lenses of the lenticular plate and the images corresponding to the lenses; positioning the lenses and the images in accordance with the result of such detection; and recording a plurality of images in the given positions of the reverse side of the lenticular plate in accordance with the positioning thus performed.

In accordance with the present invention, while positioning images with respect to the lenticular lenses on a lenticular plate, recording is performed directly on the reverse side of the lenticular plate. Therefore, it is possible to obtain the stereoscopic images clearly when the images are observed from the surface of the lenticular plate.

DESCRIPTION OF THE PREFERRED EMBODIMENTS

Hereinafter, with reference to the accompanying drawings, the description will be made of a lenticular plate 10 in accordance with the present invention, a method for forming images on the sheet, a recording apparatus for executing such method, and an information processing system using such apparatus as its output means.

(First Embodiment)

Figure 1:
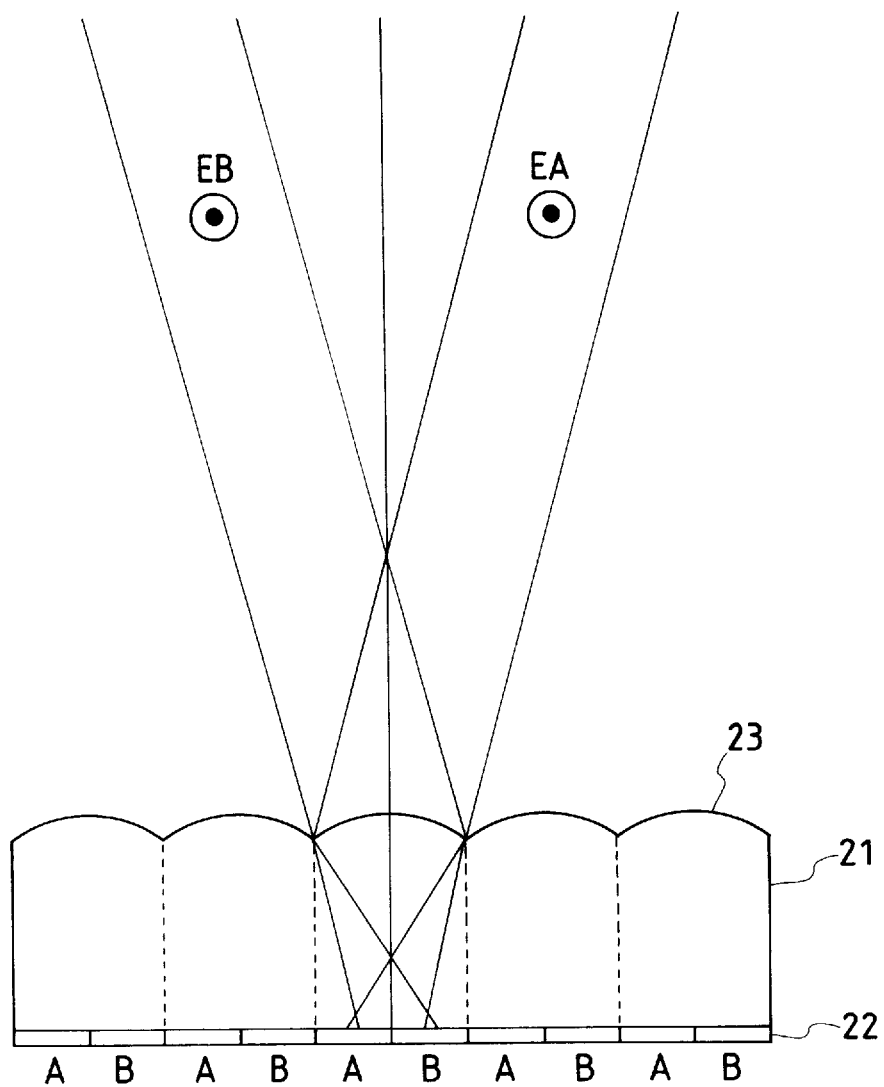
FIG. 1 is a view which shows the formation principle of stereoscopic images or animated images provided by use of a lenticular plate applicable to the conventional ink jet recording apparatus.
Figure 2:
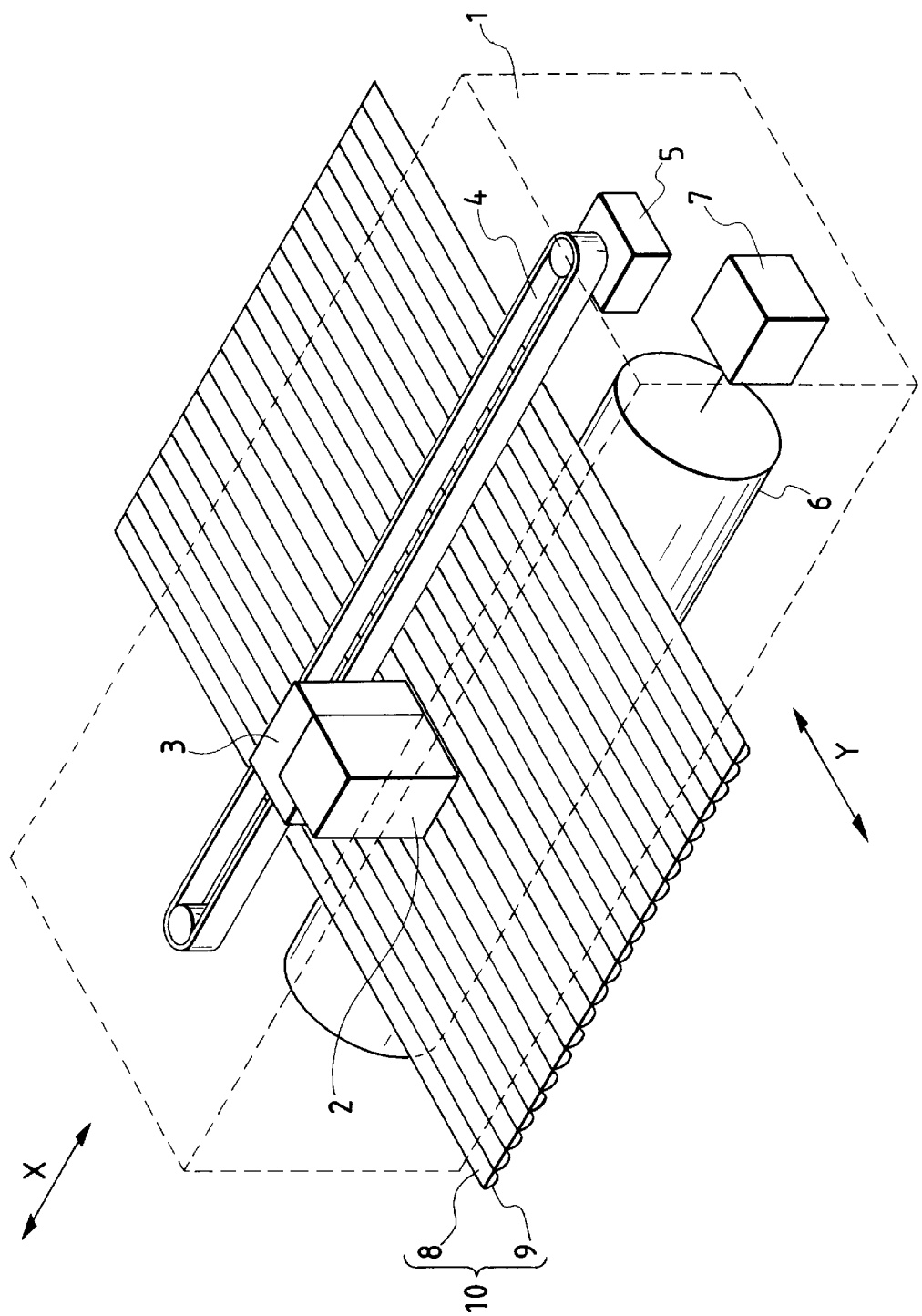
FIG. 2 is a perspective view which schematically illustrates the structure of an ink jet recording apparatus and lenticular plate in accordance with the present invention.
Figure 3:
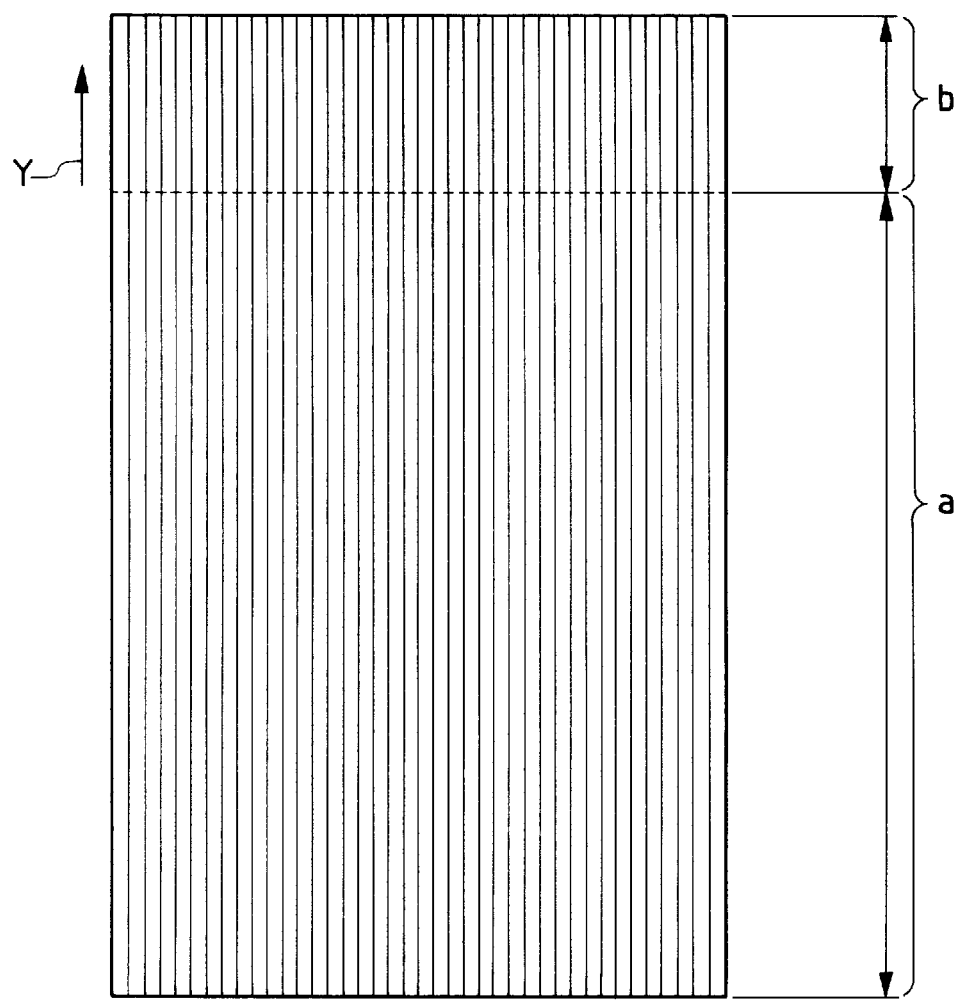
FIG. 3 is a plane view which shows one example of lenticular plate applicable to an ink jet recording apparatus in accordance with the present invention.
Figure 4:
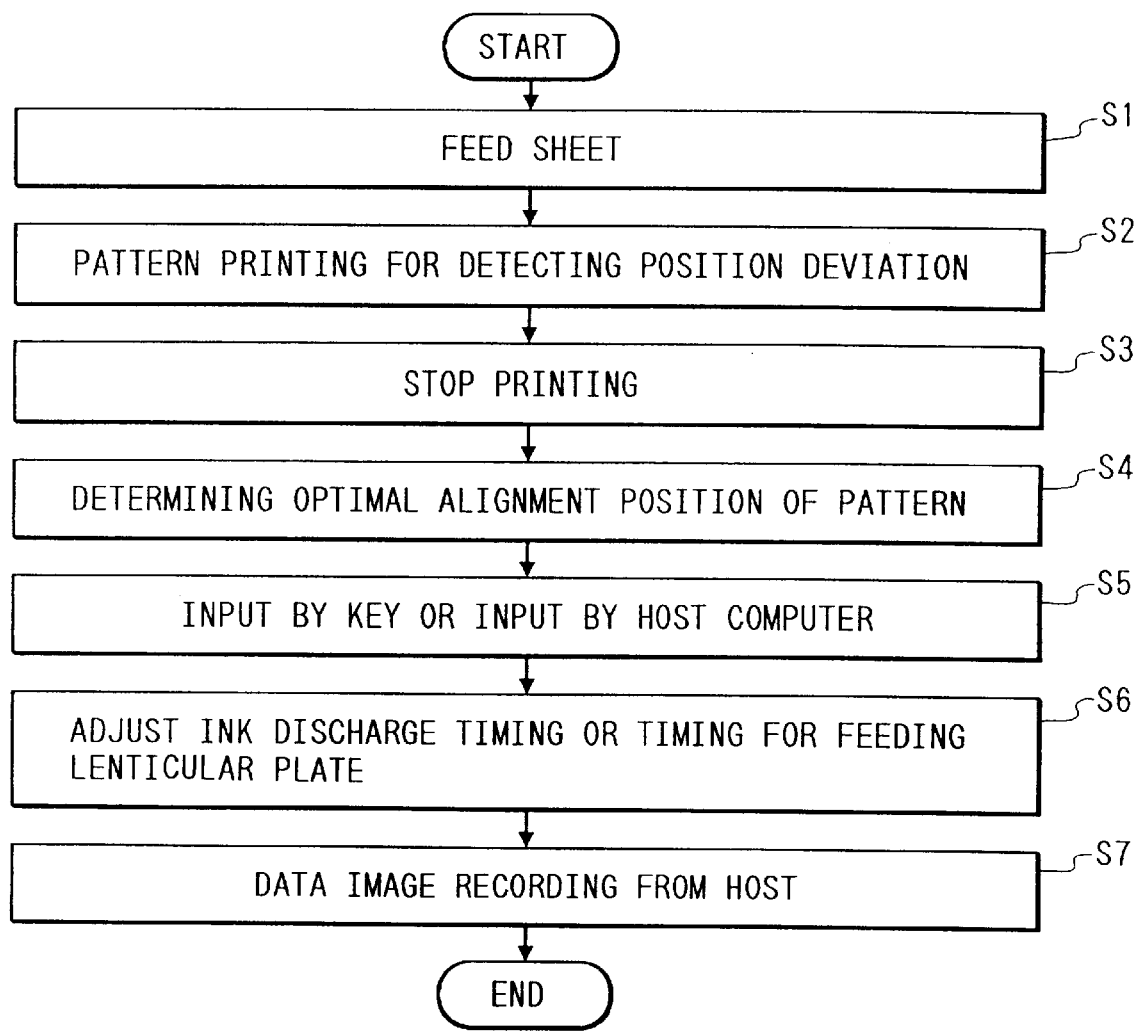
FIG. 4 is a flowchart which illustrates one example of the operation of an ink jet recording apparatus in accordance with the present invention.
Figure 5:
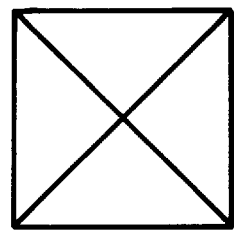
FIG. 5 is a view which represents one example of a pattern (an image for use of discrimination) to be used for detecting misregisteration, applicable to an ink jet recording apparatus in accordance with the present invention.

FIG. 2, FIG. 3, FIG. 4 and FIG. 5 are views which illustrate one embodiment in accordance with the present invention. FIG. 2 is a perspective view which schematically illustrates the structure of a recording apparatus in accordance with the present invention. FIG. 3 is a plan view which shows a lenticular plate. FIG. 4 is a flowchart which illustrates the detection of misregisteration. FIG. 5 is a view which shows a mark used for detecting misregisteration as an example.

With respect to means for forming images on a recording medium in accordance with the present embodiment, the description will be made of an ink jet method for forming images by discharging ink onto a recording medium directly as an example. With such ink jet method, it is possible to record on a recording medium without any contact between recording means and the medium. As a result, there is no possibility that the recording surface of the recording medium is damaged. There are also an advantage that while almost no noises are generated, images are formed at a high speed.

In FIG. 2, a reference numeral 1 designates an ink jet recording apparatus; 2, an ink jet recording head that discharges ink; 3 a carriage having the recording head 2 mounted on it; 4, a belt fixed to the carriage 3; 5, a first motor for driving the belt 4; 6, a carrier roller for feeding a lenticular plate 10; and 7, a second motor for driving the roller 6. Being integrally formed, the recording head 2 and carriage 3 are caused to scan in the main scanning direction (in the direction indicated by an arrow X in FIG. 2) by means of the belt 4. Also, each time recording is performed by a given main scan, the lenticular plate 10 is fed in the sub-scanning direction (in the direction indicated by an arrow Y in FIG. 2) by means of the carrier roller 6. Images are recorded when ink is discharged from the recording head 2 onto the reverse side (the side for a printing layer to be arranged on) of the lenticular plate 10, to which ink is caused to adhere and be fixed. The lenticular plate 10 comprises a surface that functions as a lens aggregate having a plurality of almost semi-cylindrical extrusions 9 (circularly convex portions: hereinafter referred to as cylindrical lenses), and a flat reverse side 8 where no extrusions are arranged (this side may also be referred to as printing surface or printing layer). For the present embodiment, a material that enhances the printability of ink is coated on the reverse side 8. This coating material may be PVA (polyvinyl alcohol) or others prepared by known technique to be coated on an OHP (overhead projector) sheet or the like as a layer to receive ink usually used by an ink jet recording apparatus. The lenticular printing medium 10 is set on the ink jet recording apparatus 1 with the reverse side of its printing layer 8 facing the recording head side.

Also, as shown in FIG. 3, the lenticular printing medium 10 comprises the stereoscopic image printing area a where given images are recorded by means of the recording head 2 in the sub-scanning direction Y, and a marginal area b where the pattern is printed for use of detecting misregisteration.

Hereunder, in conjunction with FIG. 4, the description will be made of the recording operation of an ink jet recording apparatus of the present embodiment.

At first, in step S1, a sheet is fed. In the step S2 that follows, a pattern is printed on the marginal area b shown in FIG. 3 for use of detecting misregisteration. As the pattern for use of the misregisteration, it is considered to use a pattern such as shown in FIG. 5. When observed stereoscopically, this pattern appears to be a quadrangular prism that looks like a pyramid observed from above. A plurality of patterns as shown in FIG. 5 are printed on the printing layer, while changing the amount of misregisteration, in the arrangement direction of the cylindrical lenses on the lenticular plate.

At the time of the patterns having been printed for use of detecting the misregisteration, the recording operation is once suspended automatically in the step S3. Then, in step S4, the operator of the ink jet recording apparatus 1 decides on the optimal position from among the patterns printed in the step S2 for use of detecting the misregisteration. Using the pyramid patterns it is considered to be the optimal position when the pyramid looks like the one as if observed from directly above it.

Here, the lenticular plate is formed by a transparent material. Conceivably, therefore, the marginal area for the patterns to be formed for use of detecting misregisteration is not easily observable. In such a case, it may be possible to provide a back plate for the stop position of the marginal area to make it easily observable. A white back plate is especially effective for the purpose or if the circumference is not very bright, it is also possible to obtain the same effect with the provision of a back light illumination means.

After having decided on the optimal position, the operator inputs such position in step S5 by operating keys of the ink jet recording apparatus 1 or operating a host computer connected to the ink jet recording apparatus 1.

After the position suitable for setting is completed as described above, the recording operation begins in steps S6 and S7 to form the patterns for use of stereoscopic images to be actually recorded. The recording at this time is performed in accordance with the input executed in the step S5.

In the step S6, a positioning control is made in accordance with the optimal position previously inputted. The control for this positioning is executed by shifting the ink discharge timing of the head 2 when the arrangement direction of the cylindrical lenses on the lenticular plate is aligned with the main scanning direction of the ink jet recording apparatus 1 or by adjusting the feeding timing of the lenticular plate when the arrangement direction of the cylindrical lenses on the lenticular plate 10 is aligned with the sub-scanning direction of the ink jet recording apparatus 1. Or, in either case, it may be possible to make adjustment by shifting the image data.

In this respect, as the setting is performed from the reverse side of the lenticular plate, the images to be printed are those actually observed but inverted by reflection. The formation of such inverted images due to reflection may be arranged in such a manner that either the image is inverted on the host apparatus side and transferred as it is or the image is inverted on the recording apparatus side for its formation in accordance with the transferred image data. Also, as the image should be used for printing on a lenticular plate, a plurality of images are divided into strips, and then, such image is formed by joining the stripped images one after another.

As is clear from the embodiment described above, an ink jet recording apparatus of the present invention outputs the patterns used for detecting the relative misregisteration between the images and lenticular plate 10, and determines the misregisteration between the images and the cylindrical lenses on the lenticular plate 10 in accordance with the patterns thus output. With this structure, recording is performed directly on the reverse side of the lenticular plate 10 without any contact between recording means and the plate, while positioning the images with the cylindrical lens array on the lenticular plate 10. Hence it is possible to save extra work and costs, and materialize stereoscopic images or animated images in higher quality with the arrangement of simpler structure for the recording apparatus, and the lenticular plate as well.

(Second Embodiment)

Now, with reference to the accompanying drawings, the detailed description will be made of a second embodiment in accordance with the present invention.

Figure 6:
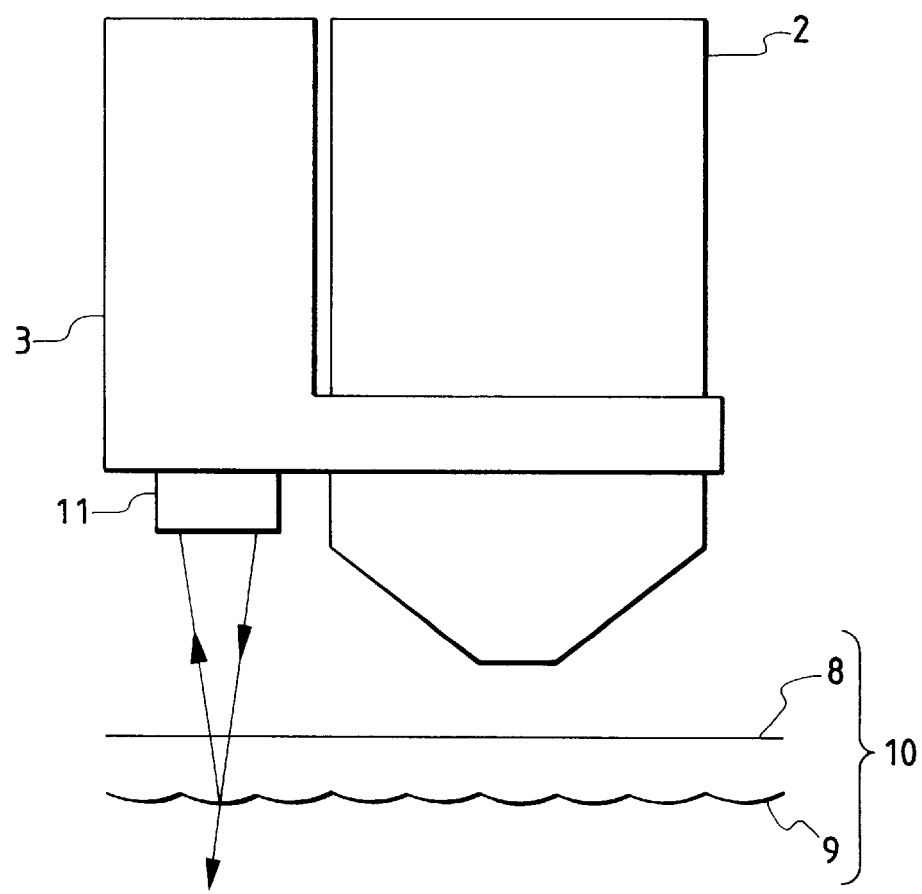
FIG. 6 is a side view schematically illustrating the structure of the recording head and photosensor of an ink jet recording apparatus in accordance with the present invention.

FIG. 6 is a side view which schematically illustrates the structure of an ink jet recording head mounted on a carriage provided for an ink jet recording apparatus in accordance with a second embodiment of the present invention, and also, illustrates the structure of a photointerruptor used therefor.

Here, reference numerals 3 to 9 designate the same constituents as those described previously in the first embodiment. A lenticular plate 10 of the present embodiment is not provided with any particular marginal area b illustrated in conjunction with FIG. 3 for the first embodiment. In accordance with the structure of the present embodiment, there is no need for recording any patterns for use of detecting misregisteration. As a result, it becomes unnecessary to arrange any marginal area on the lenticular plate for the purpose.

A reference numeral 11 designates a so-called reflection type photointerruptor, which is integrally formed by LED, the light source, and the photodetector element. The photointerruptor 11 is fixed on the carriage 3 downwardly to emit beam from the LED to a recording medium and detects the rays reflected therefrom. The direction X indicated by an arrow in FIG. 6 is the scanning direction of the carriage 3 of the ink jet recording apparatus 1. The photointerruptor 11 is arranged before the head 2 in the main scanning direction. Therefore, the photointerruptor 11 performs detection prior to the discharge from the head 2.

Also, the sub-scanning direction of the ink jet recording apparatus 1, that is, the direction in which the lenticular plate 10 is fed, is perpendicular to the surface of FIG. 6. An offset amount between the position to be detected by the photointerruptor 11 and the ink discharge position of the head 2 is exactly grasped by the application of a method, which will be described later.

Now, the description will be made of the principle adopted by the present embodiment for the detection of misregisteration.

Figure 7:
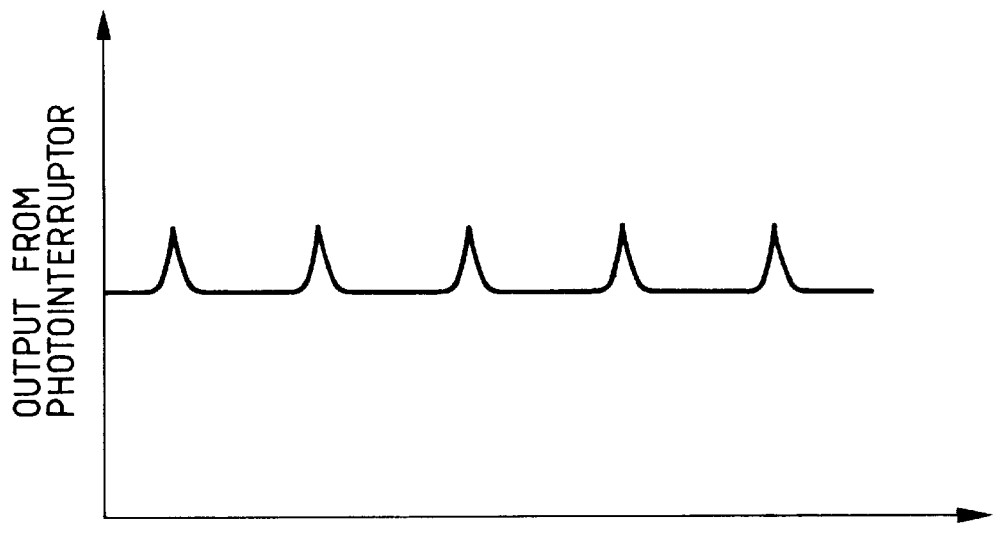
FIG. 7 is a view which shows the output waveform of a photointerruptor applicable to an ink jet recording apparatus in accordance with the present invention.

As shown in FIG. 6, the beam from the photointerruptor 11 is transmitted through the transparent lenticular plate 10 to arrive at a cylindrical lens 9 on the bottom end. On the surface of the cylindrical lenses 9, the beam from the photointerruptor 11 is diffusely reflected on the boundary surface of the adjacent cylindrical lenses 9, thus increasing the luminous energy. On the locations other than such boundary surface, most of the beam is allowed to transmit as it is, thus making the luminous energy small when detection is performed. In other words, the outputs from the photointerruptor are different when it detects each boundary between the adjacent lenses and each of the lens extrusions. Consequently, when the carriage 3 or the roller 6 is caused to scan in the arrangement direction of the cylindrical lenses 9, the output of the photo-interruptor 11 presents the cyclical waveform that indicates the portion where the output increases at each time the beam passes the boundary surface between adjacent cylindrical lenses 9 as shown in FIG. 7. From this waveform, it is possible to detect each of the boundaries between the cylindrical lenses 9 on the lenticular plate 10. Therefore, if setting is executed in accordance with the positional information thus output, it is possible to print the patterns for use of stereoscopic images on specific positions with respect to the cylindrical lens array 9.

Also, a structure may be arranged to use the cyclical waveform shown in FIG. 7 itself as triggers for use of driving timing. In accordance with such structure, triggers are generated in numbers identical to those of images retained by each of the cylindrical lenses on the lenticular plate 10, and then, ink is discharged from the head 2, each after the elapse of a given time. With this structure, it is possible to position each of the dots for the formation of images using each of the cylindrical lenses 9 on the lenticular plate 10 as reference, and to form images without creating any pitch deviation between the images and cylindrical lens array.

Further, by dividing the waveform shown in FIG. 7 electrically or optically by use of known means, it becomes possible to more reliably detect the positions for ink to be discharged within the range of each cylindrical lens. As a result, the precision of setting positions is enhanced for each of the images.

The position of images with respect to each of the cylindrical lenses 9 is usually arranged in such a way that the central position of several images is aligned with the center line of each cylindrical lens, but if the parallax within a screen should be taken into account for a lenticular plate having a large screen or the like, the image positions should be deviated appropriately in accordance with each requirement as the case may be.

By the types of the ink jet recording apparatus, it may be possible to provide linear encoder for the detection of its carriage positions in the main scanning direction in order to apply the outputs of such linear encoder as triggers for ink discharges or to detect the carriage positions in order to control its traveling to the home position exactly. In such cases, too, it is desirable to switch over and transform the waveform of the photointerruptor 11 into the triggers as required while printing on the lenticular plate. In other words, while printing, the outputs of the photointerruptor 11 should be made the respective triggers, and when the carriage is caused to travel to the areas other than its printing area, such as home position or the position where predischarges are performed, the output of the linear encoder should be made the respective triggers.

Figure 8:
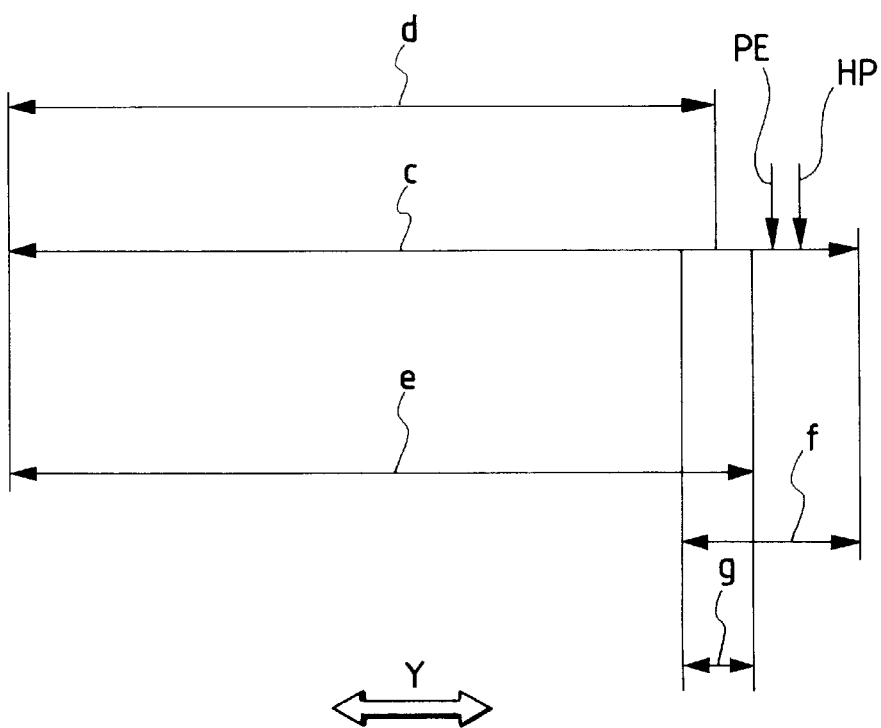
FIG. 8 is a view which shows the detection areas of the photointerruptor and linear encoder applicable to an ink jet recording apparatus in accordance with the present invention.

Also, there is a need for calibrating the outputs of the photointerruptor 11 and the linear encoder, but it should only be executed in the region where its output areas are overlapped. FIG. 8 is a view which shows the detection area of the sensor in the traveling range of the carriage. In FIG. 8, a reference mark c designates the traveling range of the carriage. In the traveling range of the carriage, there are arranged the home position HP, and a position PE where predischarges are executed to recover the discharging condition of the ink jet recording head; also, d designates the printing area: the home position HP and the position PE for the execution of predischarges are arranged outside the printing area d; e, an area where the recording timing, the carriage position, and others are controlled, while the outputs of the photointerruptor 11 being made triggers; and f, an area where the recording timing, the carriage positions, and others are controlled, while the outputs of the linear encoder are made triggers. The area g is the region where the area e and area f are overlapped. It is good enough if the calibration is performed in the area g. It is possible to carry out an exact control by implementing the adjustment of the positional control of the carriage in this area g by use of the outputs of the photointerruptor and linear encoder.

Further, by use of an ink jet recording apparatus provided with such encoder, it is possible to measure the amount of offset between the position of the beam emitted from the photointerruptor 11, and the ink discharging portion of the head 2 by the adoption of a method described below. In other words, after the test patterns are printed by use of the head 2, the patterns are read by the photointerruptor 11, which is being reversely carried. Then it should be good enough that the traveling distance of the head 2 from the position of prints to the reading position of the photointerruptor 11 is detected by means of the linear encoder.

Also, in case of a color printer, it is possible to measure the amount of such offset for each color individually. However, the usable colors are limited only to those colors detectable by the application of the waveform of light emitted from the photointerruptor 11. If the LED used for the photointerruptor 11 is such as emitting a green color whose wavelength is approximately 650 nm, it is possible to detect every color of black, cyan, magenta, and yellow used for a usual color printer.

Therefore, the color deviations often occurring in an image formed by a color printer can be minimized if only the offset amount is measured for each of the colors used in order to discharge ink of such colors each individually by the application of optimal timing.

Or it is possible to confirm whether or not printing is performed perfectly by observing the printed portion by use of the photointerruptor 11 after printing. Therefore, the detection is possible with respect to the disabled condition of ink discharges, the ink remains, or the like by utilizing the output of the photointerruptor 11: in this way, another function can be added to an ink jet recording apparatus.

With the structure described above, the further enhancement of the function of an ink jet recording apparatus is attainable without increasing costs when using the sensor provided for positioning the lenticular plate and images dually for other purposes.

As described above, in accordance with the present invention, images are recorded directly on the reverse side of the lenticular plate 10 without any contact between them, while positioning the images with the cylindrical lens array on the lenticular plate 10, by use of an ink jet recording apparatus provided with means for detecting the relative misregisteration between the images and the lenticular plate 10 together with positioning means. In this way, extra work and costs are saved, and also, it is made possible to materialize the formation of stereoscopic images or animated images on a lenticular plate in high quality with the arrangement of simple structure.

(Third Embodiment)

Now, the description will be made of a third embodiment in accordance with the present invention.

In accordance with the second embodiment, the irregularities of the cylindrical lenses 9 on the bottom end of the lenticular plate 10 themselves are detected by the photointerruptor 11, but the present invention is not necessarily limited thereto. It may be possible to arrange a mark dedicated to detecting positions on a part of the lenticular plate 10, and enable the photointerruptor 11 to read the mark. In this case, the mark for the positional detection may be a simple line pattern. However, if a plurality of line patterns are adopted, the S/N rate of the detection signals of the photointerruptor 11 is increased, thus leading to the attainment of the further enhancement of detection accuracy.

(Fourth Embodiment)

Now, with reference to the accompanying drawings, the description will be made of a fourth embodiment in accordance with the present invention.

Figure 9:
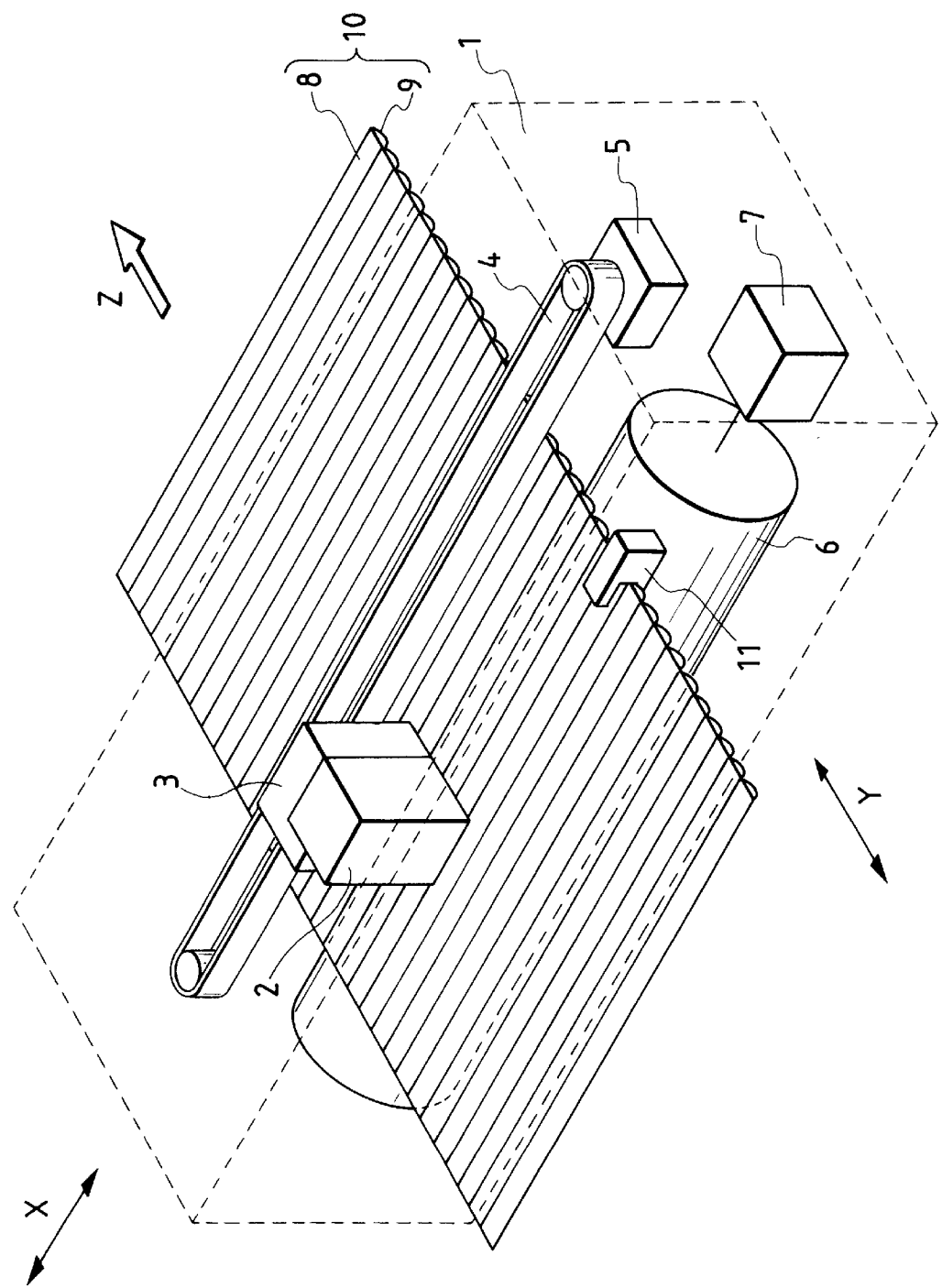
FIG. 9 is a perspective view which schematically illustrates the structure of an ink jet recording apparatus and lenticular plate in accordance with the present invention.
Figure 10:
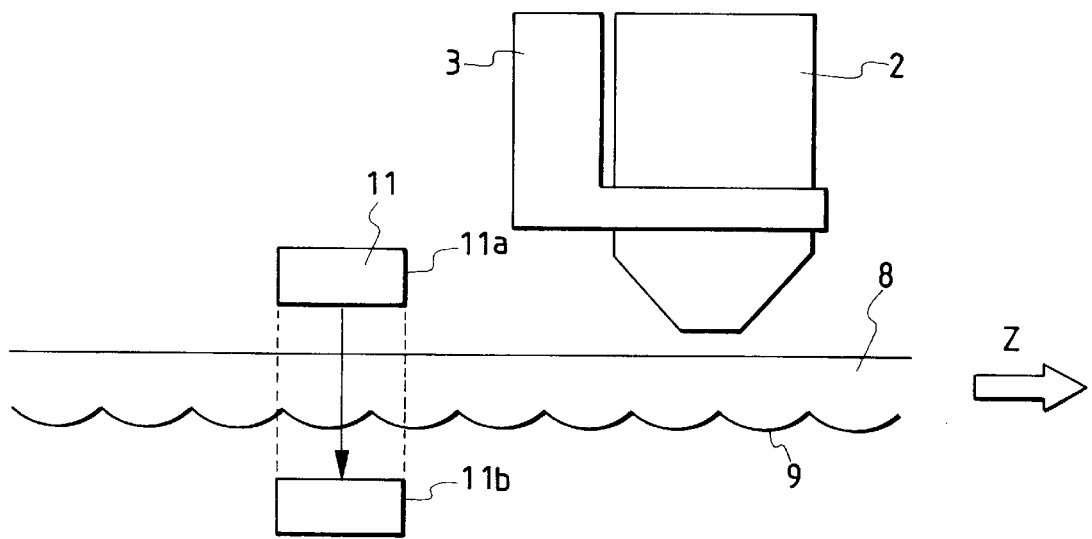
FIG. 10 is a structural view which shows the circumference of the photointerruptor applicable to an ink jet recording apparatus in accordance with the present invention.
Figure 11:
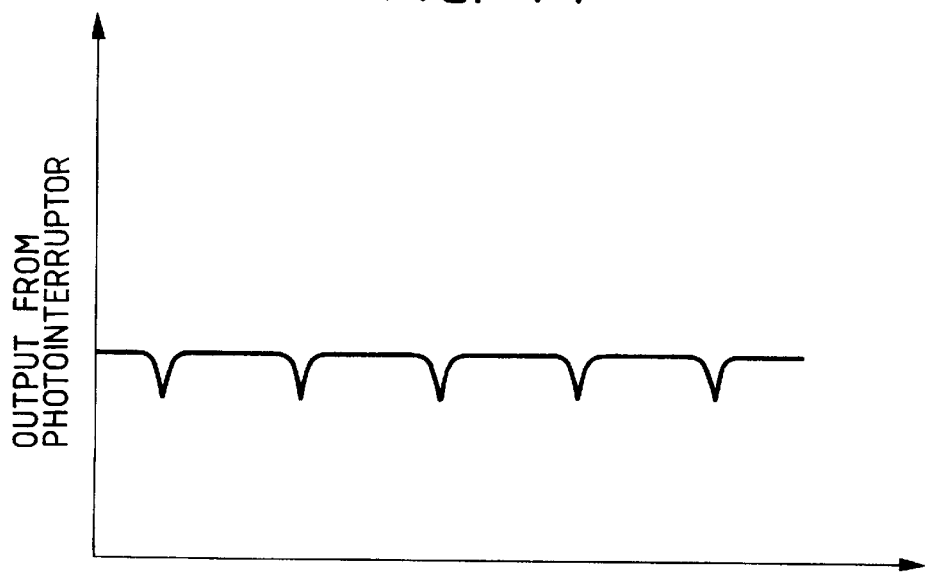
FIG. 11 is a view which represents the output waveform of the photointerruptor applicable to an ink jet recording apparatus in accordance with the present invention.

FIG. 9, FIG. 10, and FIG. 11 are views which illustrate an ink jet recording apparatus in accordance with the fourth embodiment of the present invention. FIG. 9 shows the structure of the entire body of the apparatus. FIG. 10 shows the structure around the ink jet recording head. FIG. 11 is a view illustrating the outputting condition of a photointerruptor.

In this respect, the same reference numerals are applied to the structural elements of the same functions as those provided for the apparatus described in the first embodiment with reference to FIG. 2. In the structure of the present embodiment as represented in FIG. 9, the arrangement direction of the cylindrical lens array 9 on the lenticular plate 10 is aligned with the sub-scanning direction of the ink jet recording apparatus 1. In accordance with the ink jet recording apparatus described for the first embodiment, the arrangement direction of the cylindrical lens array 9 on the lenticular plate 10 is perpendicular to the sub-scanning direction. As the second embodiment, the lenticular plate 10 to be used for the present embodiment is not provided with any marginal area, either.

In FIG. 9, an arrow Z indicates the direction in which the lenticular plate 10 is carried. In the previous embodiment, the photointerruptor 11 is mounted on the carriage 3 as shown in FIG. 6, but here, a transmitting type photointerruptor 11 is installed on the ink jet recording apparatus. As shown in FIG. 10, the photointerruptor 11 comprises a light emitting unit 11a and a photodetecting unit 11b. In FIG. 10, the light emitting unit 11a is arranged on the printing layer side of the lenticular plate, but it may be possible to arrange the structure so as to reverse the positions of the light emitting unit 11a and photodetecting unit 11b in the vertical direction. Also, the photointerruptor 11 is positioned in the location where the plate 8 arrives at earlier than the head 2 in the feeding direction of a recording sheet so that the detection of the photointerruptor 11 is performed prior to the discharge from the head 2. Also, as in the case of the second embodiment, the offset is predetermined between the discharging position of the head 2 and the position of the photointerruptor 11 for the performance of its detection.

Also, as shown in FIG. 10, the detection is performed by the photointerruptor 11 that allows the beam to be transmitted to the lenticular plate 10, and then, when the beam is impacted on the boundary portions between the cylindrical lenses 9 adjacent to each other, its rays are scattered. Therefore, the outputs are made lower in such cases than those to be made when the rays are not scattered. Therefore, the waveform represents itself as shown in FIG. 11. Here, the outputs of the sensor represented in FIG. 11 differ from the output waveform from the reflection type photointerruptor shown in FIG. 7. The waveform is such that the portions having lower outputs are generated between the cylindrical lenses 9 adjacent to each other. The positions of the boundary in the cylindrical lens array 9 are known by means of the waveform. Together with this finding, it is possible to set images on the cylindrical lens array 9 on the lenticular plate 10 exactly by use of the offset value described above.

The lenticular plate is generally formed by PC (polycarbonate), PP (polypropylene), or other plastic materials. Also, its thickness cannot be made small in some cases because the thickness is determined by the pitches of cylindrical lens array, the number of images, and the refractive index of the material to be used. As a result, there often exist lenticular plates that cannot be bent easily in the longitudinal direction of the cylindrical lenses. On the other hand, the carrier path arranged for an ink jet recording apparatus is not necessarily linear. It meanders in some cases. Even in such case, it is possible to arrange the lenticular plate to be able to carry itself as good as a paper sheet if only the arrangement direction of the cylindrical lens array, which can be bent easily due to its irregularities, is aligned with the sub-scanning direction of the ink jet recording apparatus to be used.

Also, there is a phenomenon called "cockling", that is, the condition in which the paper becomes wavy due to the absorption of ink. This is one of problems usually encountered in printing on a paper medium by use of an ink jet recording apparatus. In order to prevent the paper medium from rubbing the nozzle surface of the head due to the waving brought about by the cockling, a certain gap is provided between the nozzle surface and the printing surface. It is desirable to set such gap at less than 0.7 mm for the enhancement of printing precision. Nevertheless, for the protection of the head from being affected by this phenomenon, the gap between the nozzle surface and printing surface is often set at approximately 1 mm.

Now, in a case of printing on a lenticular plate, there is no problem of cockling, because the lens portion that constitutes the lenticular plate is made of plastic or the like that is harder than paper. Therefore, the gap between the nozzle surface of the head and the printing surface can be set at less than 0.7 mm or less as fundamentally desired. A method for setting this gap may be to set it fixedly for a printer dedicated to printing on the lenticular plate or to arrange a mechanical switch for changing the setting values for use of the ordinary paper and for use of the lenticular plate. Further, in accordance with the present embodiment, it is possible to detect whether or not the plate is being fed diagonally by the provision of two photointerruptors 11 each on the left and right side, respectively, in the feeding direction of the plate. If the lenticular plate 10 should be diagonally fed (or carried aslant), the cylindrical lens array 9 and the images to be recorded are misregistered completely, thus making it impossible to form any images stereoscopically observable. With the provision of photointerruptors 11 on the left and right sides of the medium for the detection of diagonal feed thereof, recording can be attained in higher precision.

Now, even if no detection may be possible for any diagonal feed when it occurs at more than one pitch of the cylindrical lenses 9, the diagonal feed can be suppressed by the arrangement of mechanical precision if it is to the extent of one pitch portion. Also, as a method for correcting the detected diagonal feed, there is applicable either a mechanical one wherein the feeding amount of the lenticular plate in the sub-scanning direction is controlled by making each of such amounts different on the left side and right side, respectively or a method using software, wherein the data on images to be printed are changed in accordance with the degrees of the detected diagonal feed.

Also, the lenticular plate is carried by means of the roller 6 in accordance with the present embodiment, which holds the surface side of the lenticular plate 10 where the cylindrical lens array 9 is arranged, and carries the plate by the application of frictional force. In this case, however, gaps are created between the plate and roller due to the irregularities of the cylindrical lens array 9. Therefore, in some cases, the frictional force obtained is not sufficient to carry the plate or errors are caused to occur in the amount of required feeds. To implement such feed in higher precision, it is conceivable to provide another mechanical method for holding the reverse side of the lenticular plate 10 by the application of frictional force. With the adoption of such method, there is no possibility that any gap is created between the plate and roller because the flat face of the plate is held, and the frictional force is made good enough, while minimizing the errors that may be brought about in the feeding amounts. As a result, it is possible to maintain the quality of printed images at a high level.

(Fifth Embodiment)

Now, the description will be made of a fifth embodiment in accordance with the present invention.

Usually, an ink jet recording apparatus performs its printing on a white paper. On the white paper, ink is discharged, and then, ink is absorbed by the paper to form images on the white base thereof. Therefore, when printing is performed on a lenticular plate that presents itself as a transparent element, the portions where no ink is impacted are observed in a state where the bottom of such portions is visible through the plate. Consequently, a sense of incompatibility is present on the images. To prevent this drawback, it may be possible to provide means for applying ink all over the surface of the plate by impacting ink accordingly, but it is extremely difficult to cope with the situation with respect to all the kinds of images to be printed.

Therefore, white pigments or white dyes are mixed in the coating that enhances the recording capability of ink applied to the reverse side of the lenticular as referred to in the description of the first embodiment. With this arrangement, the vision of images is made easier when recorded images are observed. As the white pigments, those publicly known, such as titanium oxide, are adoptable.

As described above, with the recording layer on the recording surface of the lenticular plate, where the white pigments mix with ink, it is possible for an ink jet recording apparatus to obtain the same image quality as in the case where it prints on the usual white paper. Ink discharged on this ink recording layer permeates into the interior of the recording layer to make images visually observable from the side where the cylindrical lenses 9 are arranged.

Also, as another means, there is a method wherein a head that discharges white ink is separately provided, and then, after images are printed on the reverse side of the lenticular plate, white ink is used to coat it all over the surface thereof. In this way, the same effect is obtainable. In such case, the printing timing should preferably be apart from each other as much as possible in order to avoid any mixture of the ink used for the formation of images and the white ink. Also, the similar effect is obtainable by preparing the composition of the white ink so as not to be mixed with black ink or ink of other colors to be used for recording.

(Sixth Embodiment)

For an ink jet recording apparatus, it is possible to use a kind of ink solidified at room temperature, but liquefied for discharge when heat is given by the head, and again solidified when adhering to a printing medium such as paper that takes heat away from the ink.

If an ink of the kind is used, a sufficiently high capability of ink retention is obtainable without any particular coating applied to the lenticular plate for the enhancement of its recording capability as referred to in the first embodiment.

Also, when setting the white ink after the formation of images as referred to in the latter half of the fifth embodiment, it is particularly preferable to use ink of the present embodiment because it is solidified quicker at room temperature than liquid ink after adhering to the medium. With the adoption of this kind of ink, it is possible to solve the problem that the white ink is mixed with the ink used for the formation of images.

(Seventh Embodiment)

Now, the description will be made of a seventh embodiment in accordance with the present invention.

Depending on the kinds of ink jet recording apparatuses, a sensing function is provided using LED or other light source combined with a photosensor. As an example, there is a registration detecting function or a setting confirmation function for sensing each of the ink discharge positions between the colors to be used as referred to in the second embodiment. Besides them, an ink discharge detecting function, an ink remains detecting function, or the like is available. If the light source and photosensor used for any one of such functions are shared by each photointerruptor adopted for use in the second or fourth embodiment, it is possible to save not only the light source and photosensor themselves, but also, the circuits surrounding them. Therefore, the reduction of costs and the curtailment of power dissipation can be attained for an apparatus as a whole.

The objective of the function to detect whether or not ink is discharged normally may be attainable by use of the setting confirmation function described above, but there is another method capable of directly detecting ink droplets discharged from the head 2 with the provision of a photosensor. The ink remains detecting function is to detect ink remains or whether or not ink remains are still more than a given value by utilizing the fact that luminous intensity becomes greater or smaller depending on the ink remains in an ink tank when light is transmitted through or caused to be reflected from the interior of the ink tank.

Although depending on the structures of the main body of ink jet recording apparatus, it is desirable from the reasons described above that both or at least either one of the light source and photosensor constituting these functions should be made dually usable as the photointerruptor serving as the sensor for detecting the positions of the lenticular plate 10 for the second or the fourth embodiment.

Also, the waveform represented in FIG. 7 for the second embodiment or in FIG. 11 for the fourth embodiment is the one generated when the lenticular plate 10 is used as a recording medium. Such waveform becomes flat when a usual paper or OHP sheet is fed as a medium to record images thereon. In this way, it is possible to discriminate the lenticular plate 10 from the other kind of medium.

As clear from the embodiments described above, in accordance with the present invention, an ink jet recording apparatus makes it possible to save extra work and costs, and materialize the formation of high quality stereoscopic images or animated images with the simple structures on both lenticular plate and apparatus sides. This ink jet recording apparatus comprises means for detecting relative misregistration between images and a lenticular plate 10, and also, positioning means in order to record images directly on the reverse side of the lenticular plate 10 without any contact between them, while conducting the positioning of the images with the cylindrical lens array on the lenticular plate 10.

Also, in accordance with the present invention, the method for recording images on a lenticular plate, the ink jet recording apparatus, and the information processing system are structured to make it possible to obtain clear stereoscopic images when observed from the surface of the lenticular plate, because images are recorded directly on the reverse side of the lenticular plate while positioning the images with the lenticular lenses on the lenticular plate.

As clear from each of the embodiments described above, in accordance with the present invention, an ink jet recording apparatus makes it possible to save extra work and costs, and materialize the formation of high quality stereoscopic images or animated images with the simple structures on both lenticular plate and apparatus sides. The ink jet recording apparatus comprises means for detecting relative misregistration between images and a lenticular plate 10, and also, positioning means in order to record images directly on the reverse side of the lenticular plate 10 without any contact between them, while positioning the images with the cylindrical lens array on the lenticular plate 10.

Also, the positions of cylindrical lenses on the lenticular plate 10 are read by means of a sensor so as to perform recording directly on the reverse side of the lenticular plate 10, while executing positioning with respect to each of the cylindrical lenses, thus making it possible to remove pitch deviations.

Further, a sensor for use to achieve the objective of the present invention is made dually usable for other purposes. It is possible to attain a further enhancement of functions of an ink jet recording apparatus without increasing costs.

Also, the sub-scanning direction and the arrangement direction of the cylindrical lenses on the lenticular plate 10 are aligned when the plate is being fed. In this way, an ink jet recording apparatus is materialized in higher precision for setting the lenticular plate 10.

Further, the reverse side of the lenticular plate 10 is held by the application of frictional force when feeding it. Thus an ink jet recording apparatus is materialized in higher precision for setting the lenticular plate 10.

Also, the gap is made as small as possible between the nozzle surface of the head of an ink jet recording apparatus and the reverse side of a lenticular plate 10 serving as the printing surface. Hence an ink jet recording apparatus is materialized in higher precision for setting the lenticular plate 10.

Also, white ink is applied by an ink jet recording apparatus to the entire surface after images are set. In this way, it is easy to improve the quality of images set by the ink jet recording apparatus on the lenticular plate 10.

Also, using ink solidified at room temperature, and liquefied for discharge by the application in the head, and then, again solidified when cooled by its adhesion to the printing medium, it is possible to improve the quality of prints set by an ink jet recording apparatus.

Also, with the provision of a layer to receive ink on the reverse side of a lenticular plate 10, it is possible to improve the quality of prints set by an ink jet recording apparatus.

(Other Embodiment)

The present invention is particularly suitably usable in a bubble jet recording head and recording apparatus developed by Canon Kabushiki Kaisha, Japan. This is because the high density of the picture element and the high resolution of the recording are possible.

The typical structure and the operational principle are preferably the ones disclosed in U.S. Pat. Nos. 4,723,129 and 4,740,796. The principle is applicable to a so-called on-demand type recording system and a continuous type recording system. Particularly however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the thermal energy is provided by the electrothermal transducer to produce film boiling on the heating portion of the recording head, whereby a bubble can be formed in the liquid (ink) corresponding to each of the driving signals. By the development and collapse of the bubble, the liquid (ink) is ejected through an ejection outlet to produce at least one droplet. The driving signal is preferably in the form of a pulse, because the development and collapse of the bubble can be effected instantaneously, and therefore, the liquid (ink) is ejected with quick response. The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion in addition to the structure of the combination of the ejection outlet, liquid passage and the electrothermal transducer as disclosed in the above-mentioned patents. In addition, the present invention is applicable to the structure disclosed in Japanese Laid-Open Patent Application No. 59-123670 wherein a common slit is used as the ejection outlet for plural electrothermal transducers, and to the structure disclosed in Japanese Laid-Open Patent Application No. 59-138461 wherein an opening for absorbing pressure wave of the thermal energy is formed corresponding to the ejecting portion. This is because the present invention is effective to perform the recording operation with certainty and at high efficiency irrespective of the type of the recording head.

The present invention is effectively applicable to a so-called full-line type recording head having a length corresponding to the maximum recording width. Such a recording head may comprise a single recording head or a plural recording heads combined to cover the entire width.

In addition, the present invention is applicable to a serial type recording head wherein the recording head is fixed on the main assembly, to a replaceable chip type recording head which is connected electrically with the main apparatus and can be supplied with the ink by being mounted in the main assembly, or to a cartridge type recording head having an integral ink container.

The provision of the recovery means and the auxiliary means for the preliminary operation are preferable, because they can further stabilize the effect of the present invention. As for such means, there are capping means for the recording head, cleaning means therefor, pressurizing or suction means, preliminary heating means by the ejection electrothermal transducer or by a combination of the ejection electrothermal transducer and additional heating element and means for preliminary ejection not for the recording operation, which can stabilize the recording operation.

As regards the kinds of the recording head mountable, it may be a single corresponding to a single color ink, or may be plural corresponding to the plurality of ink materials having different recording colors or densities. The present invention is effectively applicable to an apparatus having at least one of a monochromatic mode mainly with black, a multi-color mode with different color ink materials and a full-color mode by the mixture of the colors which may be an integrally formed recording unit or a combination of plural recording heads.

Furthermore, in the foregoing embodiment, the ink has been liquid. It may be, however, an ink material solidified at the room temperature or below and liquefied at the room temperature. Since in the ink jet recording system, the ink is controlled within the temperature not less than 30° C. and not more than 70° C. to stabilize the viscosity of the ink to provide the stabilized ejection, in usual recording apparatus of this type, the ink is such that it is liquid within the temperature range when the recording signal is applied. In addition, the temperature rise due to the thermal energy is positively prevented by consuming it for the state change of the ink from the solid state to the liquid state, or the ink material that is solidified when it is left unused is used to prevent the evaporation of the ink. In either of the cases, upon the application of the recording signal producing thermal energy, the ink may be liquefied, and the liquefied ink may be ejected. The ink may start to be solidified at the time when it reaches the recording material. The present invention is applicable to such an ink material as is liquefied by the application of the thermal energy. Such an ink material may be retained as a liquid or solid material on through holes or recesses formed in a porous sheet as disclosed in Japanese Laid-Open Patent Application No. 54-56847 and Japanese Laid-Open Patent Application No. 60-71260. The sheet is faced to the electrothermal transducers. The most effective one for the ink materials described above is the film boiling system.

The ink jet recording apparatus may be used as an output terminal of an information processing apparatus such as computer or the like, a copying apparatus combined with an image reader or the like, or a facsimile machine having information sending and receiving functions.

While the invention has been described with reference to the structures disclosed herein, it is not confined to the details set forth and this application is intended to cover such modifications or changes as may come within the purposes of the improvements or the scope of the following claims.

What is claimed is:

1. A recording apparatus provided with a recording head to form images on a recording medium, and means for feeding said recording medium, for performing image formation on a lenticular plate, as a recording medium, provided with a plurality of lenses arranged therefor in an arrangement direction, comprising:

means for forming discrimination images to be recorded on a marginal area of the lenticular plate in the arrangement direction of the plurality of lenses;

detection means for detecting misregistration between said plurality of lenses and images corresponding to said lenses, wherein said detection means detects deviation of an image position to the lenses by detecting the discrimination images; and control means for driving said recording head in accordance with the detection of said detection means in order to change the amount of deviation.

2. A recording apparatus according to claim 1, wherein said lenticular plate is provided with an image formation area where said images are formed, and said marginal area is disposed adjacent to said image formation area.

3. A recording apparatus according to claim 2, wherein said detection means causes said feeding means to suspend the feeding of said recording medium in accordance with a given timing after the formation of said discrimination images.

4. A recording apparatus according to claim 2, further comprising:

a back plate arranged corresponding to the surface portion of said lenticular plate for making said discrimination images easily recognizable.

5. A recording apparatus according to claim 4, wherein said back plate is a white plate member.

6. A recording apparatus according to claim 2, further comprising:

a back light for making said discrimination images easily recognizable.

7. A recording apparatus according to claim 2, wherein each of said discrimination images is a line pattern having a plurality of lines.

8. A recording apparatus according to claim 1, wherein the gap between said recording head and the reverse side of said lenticular plate is 0.7 mm or less.

9. A recording apparatus according to claim 1, further comprising:

feeding force transmission means for providing the reverse side of said lenticular plate with feeding force exerted by said feeding means.

10. A recording apparatus according to claim 1, wherein an ink recording layer is provided for the reverse side of said lenticular plate for enhancing the recording capability of ink.

11. A recording apparatus according to claim 10, wherein said ink recording layer contains white pigments or white dyes.

12. A recording apparatus according to claim 1, wherein said recording head is an ink jet recording head for performing image formation by discharging ink onto a recording medium.

13. A recording apparatus according to claim 12, wherein said recording head is provided with thermal energy generating means for applying thermal energy to ink to create a change of state, and to discharge the ink in accordance with such change of state.

14. A recording apparatus according to claim 1, further comprising:

recording means for applying to the reverse side of said lenticular plate white pigments or white dyes to enhance the recording capability by use of said recording head after images are recorded by said recording head.

15. A recording apparatus according to claim 14, wherein said recording means for applying white pigments or white dyes is recording means of an ink jet type for discharging the white pigments or white dyes.

16. An information processing system using the recording apparatus according to claim 1 as its output means.

17. A recording apparatus provided with a recording head to form images on a recording medium, and means for feeding said recording medium in a feeding direction, for performing image formation on a lenticular plate, as a recording medium, provided with a plurality of lenses arranged therefor, comprising:

main scanning means for mounting said recording head on a carriage, and causing said carriage to scan in a main scanning direction substantially perpendicular to the feeding direction of said feeding means;

head driving means for driving said recording head to form images on said recording medium, while said main scanning means effects the main scanning of said recording head;

detection means for detecting relative positions between said plurality of lenses and said recording head, said detection means comprising a photosensor emitting light to said lenticular plate; and control means for controlling said head driving means to drive said recording head in accordance with a change of a detection result by said detection means.

18. A recording apparatus according to claim 17, wherein said photosensor comprises a photointerruptor formed integrally with a light emitting diode and a photodetecting element.

19. A recording apparatus according to claim 17, wherein said photosensor scans a surface portion of said lenticular plate, and said control means controls the driving of said recording head in accordance with detected signals regarding cyclical changes of irregularities of said surface portion obtainable by scanning of said photosensor.

20. A recording apparatus according to claim 17, wherein the arrangement direction of said lenticular lenses is aligned with the main scanning direction of said recording head.

21. A recording apparatus according to claim 20, wherein said photosensor is installed on the carriage.

22. A recording apparatus according to claim 21, wherein said photosensor scans a surface portion of said lenticular plate, said control means uses, as triggers, detection signals of cyclical changes of irregularities of said surface portion obtainable by the scans of said photosensor performed by said main scanning means, and controls the driving of said recording head in accordance with said triggers.

23. A recording apparatus according to claim 22, wherein the driving of said recording head is controlled to enable said recording head to record after a given time from the detection signal of said photosensor with respect to the cyclic changes of said irregularities.

24. A recording apparatus according to claim 21, wherein said photosensor scans a surface portion of said lenticular plate, said control means divides electrically or optically detection signals obtainable from the scanning of said photosensor by said main scanning means with respect to cyclic changes of irregularities of said surface portion, and controls the driving of said recording head with said signals thus divided as triggers.

25. A recording apparatus according to claim 21, further comprising:

a linear encoder for detecting the positions of said carriage.

26. A recording apparatus according to claim 25, wherein said photosensor scans a surface portion of said lenticular plate, said control means selectively executes a first control mode for controlling the driving of said recording head in accordance with detection signals as triggers, said signals being obtainable by the scanning of said photosensor with respect to cyclic changes of irregularities of said surface portion, or a second control mode for controlling the driving of said recording head in accordance with detection signals of said linear encoder as triggers.

27. A recording apparatus according to claim 26, wherein said control means performs the positioning of signals output from said photosensor and signals output from said linear encoder in a region where the output area of the detection signals obtainable by the scanning of said photosensor with respect to the cyclic changes of the irregularities of said surface portion is overlapped with the output area of the detection signals of said linear encoder.

28. A recording apparatus according to claim 17, further comprising:

discharge condition detecting means for detecting the presence or absence of images recorded by said recording head by means of said photosensor, and detecting the ink discharge condition of said recording head.

29. A recording apparatus according to claim 17, wherein an arrangement direction of said lenticular lenses is aligned with the feeding direction of said feeding means.

30. A recording apparatus according to claim 29, wherein said photosensor is arranged on the recording apparatus main body side independent of said carriage.

31. A recording apparatus according to claim 29, wherein at least two of said photosensors are arranged in the vicinity of both ends of the traveling area of said recording head in the main scanning direction, respectively, and said apparatus further comprises diagonal feeding detection means for detecting whether or not said lenticular plate is fed diagonally in accordance with detected values of said two photosensors.

32. A recording apparatus according to claim 31, further comprising:

correction means for correcting diagonal feeding if said lenticular plate is diagonally fed.

33. A recording apparatus according to claim 32, wherein said correction means corrects the feeding amounts of said lenticular plate in the sub-scanning direction by making such amounts different from each other in said portions on both ends, respectively.

34. A recording apparatus according to claim 32, wherein said correction means corrects the driving of said recording head corresponding to each amount of diagonal feeds.

35. A recording apparatus according to claim 17, wherein said photosensor is utilized as means for identifying the kind of said recording medium.

36. A recording apparatus according to claim 17, wherein said photosensor is utilized as means for detecting the recording condition of said recording means.

37. A recording apparatus according to claim 17, further comprising:
   positioning means for aligning the lenses of said lenticular plate with the images to be recorded by said recording head.

38. A recording apparatus according to claim 37, wherein said positioning means performs relative registration of said lenticular plate with the position of ink adhesion by retarding the driving timing of said recording head or the traveling speed of said carriage in the main scanning direction of said recording head.

39. A recording apparatus according to claim 37, wherein said positioning means performs positioning by retarding the feeding timing of said lenticular plate in the feeding direction of said feeding means.

40. A recording apparatus according to claim 37, wherein said positioning means shifts a plurality of image fragments to be recorded by said recording head on given positions on a reverse side for a given amount in the main scanning direction or in the sub-scanning direction.

41. A recording apparatus according to claim 25, wherein said head is provided in plural number, and said apparatus further comprises detecting means for detecting relative positional relations between dots recorded by said plural heads.

42. A recording apparatus according to claim 17, wherein the gap between said recording head and the reverse side of said lenticular plate is 0.7 mm or less.

43. A recording apparatus according to claim 25, further comprising:
   measurement means for setting test patterns by said recording head on said lenticular plate, reading said test patterns by said photosensor in the main scanning direction, while causing the photosensor to scan in the direction opposite to the scanning direction of setting said patterns, and detecting by said encoder the traveling distance of said recording head from the printing position of said recording head to the reading position of said photosensor, and then, for measuring the offset amount between a light emitting position of said photosensor and an ink discharge position of said recording means.

44. A recording apparatus according to claim 25, wherein said photosensor detects a mark dedicated to positional detection set by said recording head on said lenticular plate, and said control means controls the driving of said recording head in accordance with the detection signals of said photosensor.

45. A recording apparatus according to claim 44, wherein said mark dedicated to positional detection is formed by a plurality of line patterns.

46. A recording apparatus according to claim 17, further comprising:
   means for transmitting feeding force to provide the reverse side of said lenticular plate with the feeding force of said feeding means.

47. A recording apparatus according to claim 17, wherein the reverse side of said lenticular plate is provided with an ink recording layer for enhancing the recording capability of ink.

48. A recording apparatus according to claim 47, wherein said ink recording layer contains white pigments or white dyes.

49. A recording apparatus according to claim 17, wherein said recording head is an ink jet recording head for performing image formation by discharging ink onto a recording medium.

50. A recording apparatus according to claim 49, wherein said recording head is provided with thermal energy generating means for applying thermal energy to ink to create a change of state, and to discharge the ink in accordance with such change of state.

51. A recording apparatus according to claim 49, wherein said photosensor is utilized as means for detecting ink remains in an ink tank conductively connected with said recording head to retain and supply ink.

52. A recording apparatus according to claim 17, further comprising:
   recording means for applying to the reverse side of said lenticular plate white pigments or white dyes to enhance the recording capability by use of said recording head after images are recorded by said recording head.

53. A recording apparatus according to claim 52, wherein said recording means for applying white pigments or white dyes is recording means of an ink jet type for discharging the white pigments or white dyes.

54. A recording apparatus according to claim 49, further comprising:
   ink fixation means for fixing recorded ink.

55. A recording apparatus according to claim 49, wherein said ink is solidified at room temperature, and liquefied for discharge by the application of heat in said recording head.

56. An information processing system using the recording apparatus according to claim 17 as its output means.

57. An image formation method for use with a recording head to form images on a recording medium, and feeding means for feeding said recording medium, said method for forming images on a lenticular plate, as its recording medium, provided with an array of a plurality of lenses arranged thereon, said method comprising the steps of:
   recording by use of said recording head test images formed by a plurality of given images at given intervals in a given area on said lenticular plate;
   selecting one of said given images from among said plurality of given images; and
   forming images by controlling the driving of said recording head in accordance with the given image selected in said selection step, wherein positions of dots to be recorded by said recording head are controlled in said image forming step with respect to the array of said plurality of lenses.

58. An image formation method according to claim 57, wherein a plurality of given images are recorded in said test image formation step, while changing the amount of misregistration by said recording head in the arrangement direction of said plurality of lenses.

59. An image formation method according to claim 57, wherein said recording head is an ink jet recording head for the formation of images on a recording medium by discharging ink onto the medium.

60. An image formation method according to claim 59, wherein said recording head is provided with thermal energy generating means for applying thermal energy to ink to create a change of state, and to discharge the ink in accordance with such change of state.

61. An image formation method for use with a recording head to form images on a recording medium, and feeding means for feeding said recording medium, said method for forming images on a lenticular plate, as its recording medium, provided with an array of a plurality of lenses arranged thereon, said lenticular plate having a surface portion with said plurality of lenses arranged thereon, and a reverse side flatly formed, said method comprising the steps of:

detecting relative positions between the lenses of said lenticular plate and images corresponding to said lenses;

positioning said lenses and said images in accordance with a result of said detection; and recording said plurality of images on given positions on the reverse side of said lenticular plate in accordance with said positioning step, wherein said recording head is an ink jet recording head for the formation of images on said recording medium by discharging ink onto said medium.

62. An image formation method according to claim 61, wherein positions of dots recorded by said recording head are controlled in said recording step with respect to the array of said plurality of lenses.

63. An image formation method according to claim 61, wherein a plurality of given images are recorded in said recording step, while changing an amount of misregistration by said recording head in the arrangement direction of said plurality of lenses.

64. An image formation method according to claim 61, wherein said recording head is provided with thermal energy generating means for applying thermal energy to ink to create a change of state, and to discharge the ink in accordance with such change of state.

65. An ink jet recording apparatus having an ink jet head for discharging ink to form an image on a recording medium and conveying means for conveying the recording medium, said apparatus recording on a recording medium comprising a lenticular plate provided with a plurality of lenses arranged in an arrangement direction, said apparatus comprising:

test image recording control means for controlling recording by said ink jet head of a plurality of predetermined images with a predetermined interval along the arrangement direction of said plurality of lenses at a predetermined area of said lenticular plate; and control means for controlling driving of said ink jet head in accordance with positional information in which a selected predetermined image is recorded among said plurality of predetermined images.

66. An apparatus according to claim 65, wherein said control means controls a position of dots formed by ink droplets discharged from said ink jet head to an array of said lenses.

67. An apparatus according to claim 65, wherein said lenticular plate has an image forming area for forming the images and a blank area adjacent to said image forming area, and said test image control means controls forming of said predetermined images on said blank area.

68. An apparatus according to claim 67, further comprising a back plate for facilitating viewing of said predetermined images, said back plate being opposed to a surface of said lenticular plate.

69. An apparatus according to claim 68, wherein said back plate is a white plate.

70. An apparatus according to claim 67, further comprising a back light for facilitating viewing of said predetermined images.

71. An apparatus according to claim 67, wherein each of said predetermined images comprises a plurality of line patterns.

72. An apparatus according to claim 65, wherein a distance between said ink jet head and a back surface of said lenticular plate is set to be no more than 0.7 mm.

73. An apparatus according to claim 65, further comprising conveying force transmitting means for applying a conveying force of said conveying means to a back surface of said lenticular plate.

74. An apparatus according to claim 65, wherein a back surface of said lenticular plate is provided with an ink recording layer for improving ink recording properties.

75. An apparatus according to claim 74, wherein said ink recording layer includes a white pigment or a white dye.

76. An apparatus according to claim 65, wherein said ink jet head comprises thermal energy generating means for applying thermal energy to ink and causes a state change in the ink by heat to discharge the ink due to the state change.

77. An apparatus according to claim 65, further comprising second recording means for recording a white pigment or a white dye on a back surface of said lenticular plate to improve the recording properties after image recording by said recording head.

78. An apparatus according to claim 77, wherein said second recording means is ink jet recording means for discharging the white pigment or the white dye to record.

79. An ink jet recording method for use with an ink jet head for discharging ink to form an image on a recording medium and conveying means for conveying the recording medium, said method recording on a recording medium comprising a lenticular plate provided with a plurality of lenses arranged in an arrangement direction, said method comprising the steps of:

test image recording with said ink jet head a plurality of predetermined images with a predetermined interval along the arrangement direction of said plurality of lenses at a predetermined area of said lenticular plate;

selecting one predetermined image based on said plurality of predetermined images; and controlling driving of said ink jet head to record in accordance with positional information of a predetermined image selected in said selecting step.

80. A method according to claim 79, wherein at said controlling step a position of dots formed by ink droplets discharged from said ink jet head is controlled to said array of said lenses.

81. A method according to claim 79, wherein said lenticular plate has an image forming area for forming the images and a blank area adjacent to said image forming area, and in said test image recording step said predetermined images are formed on said blank area.

82. A method according to claim 81, wherein a back plate for facilitating viewing of said predetermined images is provided, said back plate being opposed to a surface of said lenticular plate.

83. A method according to claim 82, wherein said back plate is a white plate.

84. A method according to claim 81, wherein a light for facilitating viewing of said predetermined images is provided.

85. A method according to claim 81, wherein each of said predetermined images comprises a plurality of line patterns.

86. A method according to claim 79, wherein a distance between said ink jet head and a back surface of said lenticular plate is set to be no more than 0.7 mm.

87. A method according to claim 79, further comprising the step of applying a conveying force of said conveying means to a back surface of said lenticular plate.

88. A method according to claim 79, wherein said back surface of said lenticular plate is provided with an ink recording layer for improving ink recording properties.

89. A method according to claim 88, wherein said ink recording layer includes a white pigment or a white dye.

90. A method according to claim 79, wherein said ink jet head has thermal energy generating means for applying thermal energy to ink and causes a state change in the ink by heat to discharge the ink due to the state change.

91. A method according to claim 79, further comprising a second recording step of recording a white pigment or a white dye on a back surface of said lenticular plate to improve the recording properties after image recording by said recording head.

92. A method according to claim 91, wherein in said second recording step an ink recording layer is formed by discharging the white pigment or the white dye.

* * * * *

UNITED STATES PATENT AND TRADEMARK OFFICE
CERTIFICATE OF CORRECTION

PATENT NO. : 5,812,152
DATED : September 22, 1998
INVENTOR(S) : TORIGOE ET AL.

It is certified that error appears in the above-identified patent and that said Letters Patent is hereby corrected as shown below:

On the title page,:

Item [56] References Cited:
          FOREIGN PATENT DOCUMENTS, "4136836" should read
     --4-136836--, and "5216138" should read --5-216138--.

COLUMN 17:
     Line 11, "a" (second occurrence) should be deleted.

Signed and Sealed this

Thirteenth Day of July, 1999

Attest:

Q. TODD DICKINSON

Attesting Officer

Acting Commissioner of Patents and Trademarks